United States Patent
Negishi et al.

(10) Patent No.: US 12,536,815 B2
(45) Date of Patent: Jan. 27, 2026

(54) VEHICLE CABIN MONITORING SYSTEM

(71) Applicant: Tobii Technologies Limited, Galway (IE)

(72) Inventors: Georgiana Negishi, Tokyo (JP); Szabolcs Fulop, Brasov (RO); Tudor Topoleanu, Brasov (RO); Paul George, Troy, MI (US)

(73) Assignee: Tobii Technologies Limited, Galway (IE)

( * ) Notice: Subject to any disclaimer, the term of this patent is extended or adjusted under 35 U.S.C. 154(b) by 543 days.

(21) Appl. No.: 17/939,063

(22) Filed: Sep. 7, 2022

(65) Prior Publication Data

US 2024/0078820 A1    Mar. 7, 2024

(51) Int. Cl.
    *G06K 9/00*      (2022.01)
    *G06V 10/25*      (2022.01)
    (Continued)

(52) U.S. Cl.
    CPC ............ *G06V 20/597* (2022.01); *G06V 10/25* (2022.01); *G06V 10/82* (2022.01); *G06V 40/10* (2022.01)

(58) Field of Classification Search
CPC .... G06V 10/82; G06V 10/764; G06V 20/597; G06V 20/59; G06N 3/08; G06N 3/045
See application file for complete search history.

(56) References Cited

U.S. PATENT DOCUMENTS 9,129,505 B2    9/2015    Breed et al.
11,017,250 B2    5/2021    Turcot et al.
(Continued)

FOREIGN PATENT DOCUMENTS

EP    3668015 A2    6/2020
EP    3580691 B1    7/2020
(Continued)

OTHER PUBLICATIONS

Aaqib Saeed, Tanir Ozcelebi, Johan Lukkien, Jan B.F. van Erp, Stojan Trajanovski, "Model Adaptation and Personalization for Physiological Stress Detection", IEEE 5th International Conference on Data Science and Advanced Analytics, 2018, 8 pages.
(Continued)

*Primary Examiner* — Gregory A Morse
*Assistant Examiner* — Owais Iqbal Memon
(74) *Attorney, Agent, or Firm* — Christopher Ignatius Moylan

(57) ABSTRACT

A vehicle cabin monitoring system includes a customization profile for storing: annotated images associated with annotation(s) indicating a ground truth for an associated region of an image; and a plurality of core processing parameters for an image processing component of an image processor. The system is: responsive to user interaction with a user interactive control of the vehicle within a field of view of a camera for storing an image acquired by the camera at the time of interaction in the customization profile with an annotation indicating a ground truth for an associated region of the image according to the interaction; and configured to use images from the customization profile for re-training an image processing component of the processor and for storing updated core processing parameters produced by the re-training in the customization profile for use by the re-trained image processing component in processing subsequently acquired images.

13 Claims, 2 Drawing Sheets

(51) Int. Cl.
*G06V 10/82* (2022.01)
*G06V 20/59* (2022.01)
*G06V 40/10* (2022.01)

(56) References Cited

U.S. PATENT DOCUMENTS

| | | | |
|---|---|---|---|
| 11,210,537 | B2 | 12/2021 | Koivisto et al. |
| 2014/0097957 | A1* | 4/2014 | Breed .................. G08B 21/06 340/576 |
| 2017/0099295 | A1 | 4/2017 | Ricci et al. |
| 2019/0213429 | A1* | 7/2019 | Sicconi .................. G06F 3/012 |
| 2020/0311475 | A1* | 10/2020 | el Kaliouby ......... G06V 10/764 |
| 2021/0402942 | A1* | 12/2021 | Torabi ...................... G06N 3/02 |
| 2022/0277172 | A1 | 9/2022 | O'Connell et al. |
| 2023/0347903 | A1* | 11/2023 | Katz .................... G06V 20/597 |
| 2024/0143072 | A1* | 5/2024 | Arar .................... G06F 18/2148 |

FOREIGN PATENT DOCUMENTS

| | | |
|---|---|---|
| WO | 2019042703 A1 | 3/2019 |
| WO | 2019145578 A1 | 8/2019 |
| WO | 2022/111909 A1 | 6/2022 |
| WO | 2023/274832 A1 | 1/2023 |

OTHER PUBLICATIONS

Shuang Li, Jin-Ming Zhang, Wenxuan Ma, Chi Harold Liu, Wei Li, "Dynamic Domain Adaptation for Efficient Inference", CVPR, 2021, 10 pages.

Yu Zhang, Gongbo Liang, Nathan Jacobs, "Dynamic Feature Alignment for Semi-supervised Domain Adaptation", BMVC, 2021, 13 pages.

Xinshao Wang, Yang Hua, Elyor Kodirov, David A. Clifton, Neil M. Robertson, "ProSelfLC: Progressive Self Label Correction for Training Robust Deep Neural Networks", arXiv:2005.03788v6, Jun. 2021, 12 pages.

Claudio Bettini, Gabriele Civitarese, Riccardo Presotto, "Personalized Semi-Supervised Federated Learning for Human Activity Recognition (HAR)", arXiv:2104.08094v2, Apr. 19, 2021, 19 pages.

A. Kashevnik, I. Lashkov, A. Ponomarev, N. Teslya and A. Gurtov, "Cloud-Based Driver Monitoring System Using a Smartphone," in IEEE Sensors Journal, vol. 20, No. 12, pp. 6701-6715, Jun. 15, 2020, 14 pages.

* cited by examiner

VEHICLE CABIN MONITORING SYSTEM

FIELD

The present invention relates to a vehicle cabin monitoring system.

BACKGROUND

Future safety standards will require monitoring of occupants including drivers of a vehicle to identify the state of the occupants and where necessary to take action if an occupant is not in safe state. For example, it is necessary to ensure that a driver has their hand(s) on a steering wheel, that they are looking at the road, that the occupants are properly seated within the cabin, that they are wearing their seat-belts correctly etc., and, if not, corrective action such as warning the occupant or slowing or stopping the vehicle may be required.

Some of these tasks can potentially be performed optically with one or more cabin facing image acquisition devices connected to an image processing system such as disclosed in PCT Application No. PCT/EP2022/067154 (Ref: FN-676-PCT), the disclosure of which is herein incorporated by reference. Note that such image acquisition devices can comprise monocular cameras, stereo camera systems, visible wavelength cameras, infra-red sensitive cameras and any combination of frame-based camera or event camera, such as described in WO2022/111909 (Ref: FN-663-PCT), the disclosure of which is herein incorporated by reference.

Referring now to FIG. 1, as disclosed in PCT Application No. PCT/EP2022/067154 (Ref: FN-676-PCT), an exemplary vehicle cabin monitoring system, VCMS, acquires successive images 300 from an image acquisition device 104 mounted in a cabin of the vehicle. Camera image information is provided to respective a body detector 302, hand detector 304 and face detector 306.

The body detector 302 is configured to identify one or more regions of the image bounding a human body. Similarly the face detector 306 identifies regions bounding the faces of a driver and any passenger respectively. Finally, the hand detector 304 identifies hand regions.

It will be appreciated that detectors can include any of, for example, classical Haar type detectors or neural network based detectors. In the case of neural network detectors, networks with similar or identical structures, but trained to use different weights can be used for each of the body detector 302, hand detector 304 and face detector 306. These detectors can be run serially, where the intermediate or final output of one may boost the performance of another, or in parallel in particular using a multi-core neural network processor of the type disclosed in European Patent Nos. EP 3580691 (Ref: FN-618-EP) and EP 3668015 (Ref: FN-636-EP).

Typically, such networks will produce a set of confidence levels for bounding boxes at different scales and proportions at respective locations across the image. Up to 4 mutually exclusive bounding boxes 308 with confidence levels above a threshold amount can be chosen as body regions. Thus, for each body region, an x,y location of its origin within the image, along with a width and height and a confidence level for the body region will be provided from the body detector 304.

Similarly, up to 4 mutually exclusive bounding boxes with confidence levels above a threshold amount can be chosen as face regions 310. Thus, for each face region, an x,y location of its origin within the image, along with a width and height and a confidence level for the face region will be provided from the face detector 308.

Finally, up to 8 mutually exclusive bounding boxes 312 with confidence levels above a threshold amount can be chosen as hand regions. Again, for each hand region, an x,y location of its origin within the image, along with a width and height and a confidence level for the hand region will be provided from the hand detector 304.

It will be understood that where it is possible for there to be fewer or more occupants of a vehicle, the maximum number of body, face and hand boxes can be varied accordingly.

Each bounding box 308 for a body region is provided to a body skeleton detector 314. When such a detector is implemented with a neural network, it typically requires its input image to be normalised, including expanding and possibly re-shaping the bounding box for the body.

A hand filter 317 looks at the bounding boxes 312 for each hand identified by the hand detector 304 and associates a hand bounding box 312 nearest and/or most overlapping a wrist location, identified by the skeleton detector 314 as the left or right hand region corresponding to the body.

Pairs of left and right hand regions identified for a given body are fed to respective networks 316, 318. Again, these networks 316, 318 require their input images to be normalised. Again, it is most likely that a detected hand region will be smaller than this size. Again, as with the detected body region(s), the system first re-shapes each hand region, by expanding the width of hand region, so that it comprises a square centered around the originally detected hand region. The re-shaped hand region is then expanded to comprise a region 322-L, 322-R corresponding to the input map size of the networks 316, 318. When only one hand region is associated with a given body, one or both of the networks 316, 318 can be executed with the second hand region input being blank.

Each of the networks 316, 318 comprise identical structures and produce corresponding outputs, with each output corresponding to a user activity of concern, for example: smoking, eating, talking on the phone, texting.

However, the network 316 is trained with images of occupants involved in such activities where the objects involved in the activity, for example, a cigarette, food or a phone are not visible. On the other hand, the network 318 is trained with images of occupants involved in such activities where the objects are visible in at least one hand region of the input image. The output produced by the network 316 is labelled handCompare and qualified by the type of (unseen) object associated with the activity, e.g. cigarette, food, phone. The output produced by the network 318 is labelled gestureCompare and qualified by the type of visible object associated with the activity, again: cigarette, food, phone.

For each body region 308, each of the classifications produced by the networks 316, 318, the left/right hand inference produced by the hand filter 317, the skeleton data produced by the detector 314 and the location of the face region 310 are fed to occupant behaviour logic 320 to make a final classification of the activity for the occupant corresponding to the identified body region.

All of the above information can be produced from a single image (or image tensor) 300 from image acquisition device 104, or inference made on previously acquired image information can also be used to improve the operation of the various modules.

For example, a smoking detector 322 makes a simple contrast measurement on each instance of face region detected in a sequence of images. It will be appreciated that when an occupant smokes, they will periodically exhale smoke and this tends to lower the contrast of the image in the region of their face during this period. When such a periodic fluctuation in contrast is detected, then the smoking detector 322 can signal that the occupant corresponding to the face region may be smoking.

As will be appreciated, in variants of the above described VCMS, further network components can be added or substitute the above described components to for example, classify a pose of any bodies detected within the field of view, possibly using the output of the skeleton detector 314, or to identify a gaze angle of an occupant such as a driver, for example, as described in WO2019/145578 (Ref: FN-630-PCT) the disclosure of which is herein incorporated by reference.

When network components of the VCMS including the networks 302, 304, 306, 314, 316-318, 320 and 322 are trained on a global dataset, they may struggle to take into account: inter-subject differences, such as a variety of hand shapes, skin colors, eye size and shape, facial hair; subjects with special needs, for example, missing limbs, fingers, facial scars; and unlimited variations in accessories, such as, tattoos, rings, bracelets, gloves, facial rings.

It is therefore desirable to be able to customize such systems, for example, on a per vehicle or per user basis.

One approach for doing so involves adapting the thresholds applied to the confidence levels provided by the various network components in order to tune the system for a given user.

So, for example, if a system is producing too few hand detections, (so potentially failing to detect that a driver is in correct control of a vehicle), the threshold(s) being used by the hand detector 304 could be lowered.

However, while such an approach can produce limited improvements, it does not affect the core processing layers of the network 302, 304, 306, 314, 316-318, 320 and 322 and so cannot adapt the inferential ability of those networks.

Other relevant approaches to adapting network behavior are summarized below:

Aaqib Saeed, Tanir Ozcelebi, Johan Lukkien, Jan B. F. van Erp, Stojan Trajanovski, "Model Adaptation and Personalization for Physiological Stress Detection", IEEE 5th International Conference on Data Science and Advanced Analytics, 2018, discloses a stress recognition model fed by multimodal physiological signals (e.g. skin conductance and heart rate). The model, based on a deep reconstruction classification network, is adapted to a new target domain and personalized for each test subject using multi-task learning (MTL) with hard parameter sharing of mutual representation and task-specific layers. Domain adaption is achieved via a hybrid model comprising temporal convolutional and recurrent layers that perform shared feature extraction through supervised source label predictions and unsupervised target data reconstruction.

Shuang Li, Jin-Ming Zhang, Wenxuan Ma, Chi Harold Liu, Wei Li, "Dynamic Domain Adaptation for Efficient Inference", CVPR, 2021 discloses a dynamic domain adaptation (DDA) framework, which can simultaneously achieve efficient target inference in low-resource scenarios and inherit the favorable cross-domain generalization brought by domain adaptation. DDA integrates various domain confusion constraints into any typical adaptive network, where multiple intermediate classifiers can be equipped to infer "easier" and "harder" target data dynamically. A confidence score learning strategy is used to derive accurate target pseudo labels by fully exploring the prediction consistency of different classifiers; and a class-balanced self-training strategy is used to explicitly adapt multi-stage classifiers from source to target without losing prediction diversity.

Yu Zhang, Gongbo Liang, Nathan Jacobs, "Dynamic Feature Alignment for Semi-supervised Domain Adaptation", BMVC, 2021 discloses dynamic feature alignment to address both inter- and intra-domain discrepancy. Target features are aligned to a set of dynamically updated class prototypes, for both minimizing divergence and pseudo-labeling.

Xinshao Wang, Yang Hua, Elyor Kodirov, David A. Clifton, Neil M. Robertson, "ProSelfLC: Progressive Self Label Correction for Training Robust Deep Neural Networks", arXiv:2005.03788v6, June 2021 is concerned with semi-supervised learning, where only a subset of training examples are annotated, leading to missing labels, and discloses progressively increasing trust in a predicted label distribution versus an annotated one if a model has been trained for enough time and the prediction is of low entropy (high confidence).

Claudio Bettini, Gabriele Civitarese, Riccardo Presotto, "Personalized Semi-Supervised Federated Learning for Human Activity Recognition (HAR)", arXiv:2104.08094v2, 19 Apr 2021 discloses federated learning (FL) in HAR. FedHAR combines active learning and label propagation to semi-automatically annotate the local streams of unlabeled sensor data, and it relies on FL to build a global activity model in a scalable and privacy-aware fashion.

A. Kashevnik, I. Lashkov, A. Ponomarev, N. Teslya and A. Gurtov, "Cloud-Based Driver Monitoring System Using a Smartphone," in IEEE Sensors Journal, vol. 20, no. 12, pp. 6701-6715, 15 Jun. 2020, discloses a distributed driver monitoring system utilizing a smartphone mounted on a vehicle windshield directed towards the driver's face tracked by the front-facing camera for detecting dangerous states for a driver in a vehicle. Using information from camera video frames as well as other sensors, the system determines drowsiness, distraction, aggressive driving, and high pulse rate dangerous states that can lead to road accidents. A cloud system architecture captures statistics from vehicle drivers, analyzes it and personalizes the smartphone application for the driver.

US2017/0099295 discloses a system to access one or more user profiles that govern one or more vehicle functions. The system cooperates with a processor and verification module which are adapted to verify, using one or more of biometric information, gesture recognition, facial recognition and device identification information, that a user has authority to access the one or more user profiles, where the one or more profiles are stored in one or more of a vehicle, a cloud and a communications device. An edit module is further provided and adapted to allow the user to make one or more edits to the one or more user profiles.

U.S. Pat. No. 11,210,537 discloses determining detected object data representative of locations of detected objects in a field of view. One or more clusters of the detected objects are generated based at least in part on the locations and features of the cluster are determined for use as inputs to a machine learning model(s). A confidence score, computed by the machine learning model(s) based at least in part on the inputs, is received, where the confidence score is representative of a probability that the cluster corresponds to an object depicted at least partially in the field of view. Ground truth data is determined for training object detectors, such as for determining coverage values for ground truth objects using associated shapes, and for determining soft coverage values for ground truth objects.

U.S. Pat. No. 9,129,505 discloses a system that obtains information about a driver who traveled the same road at a previous time, and a processor that analyzes the obtained information and vehicle movement to determine whether the driver has lost the ability to continue to control the vehicle. The loss of ability to continue to control the vehicle arises from the driver falling asleep or otherwise being incapable of controlling the vehicle after initially having been awake or otherwise capable of controlling the vehicle.

A reactive component is affected by the processor's determination that the driver has lost the ability to continue to control the vehicle, and preferably requires action by the driver to indicate regaining of the ability to operate the vehicle or exerting control over the vehicle to slow the vehicle and bring it to a stop.

U.S. Pat. No. 11,017,250 discloses vehicle manipulation using convolutional neural network (CNN) image processing. A temporal cooccurrence with an external stimulus can include a facial expression, cognitive state, emotional state, mental state, mood, and so on, that can occur at a time substantially similar to the time of the external stimulus. For example, an angry facial expression can occur when the occupant of the vehicle is cut off in traffic by a rude operator of another vehicle. An emotion classifier is trained for emotional content. The emotion classifier can be used to determine a given emotion based on collected and analyzed image data. The emotion classifier can be used to infer a cognitive state based on emotional content within a face, where the cognitive state can include drowsiness, fatigue distraction impairment, and so on. Deep learning can be used to identify cognitive states, mental states, emotional states, moods, and so on.

It is an object of the present invention to improve the inferential ability of a vehicle cabin monitoring system for the specific vehicle or a specific occupant of the vehicle.

SUMMARY

According to the present invention, there is provided a vehicle cabin monitoring system according to claim 1.

Embodiments of the invention are capable of self-learning and dynamically adapting their performance for a particular vehicle or personal profile.

Embodiments obtain live ground truth data from the vehicle during normal operation by correlating car geometry with information from vehicle controls/features such as buttons, seatbelt buckles, car horn, door handles, etc.

Ground truth image data can stored locally and securely, for example, using encrypted storage.

Stored ground truth data enables on the edge adaptation of the core processing layers of system components including dynamically updating the weights employed by such components.

On the edge adaption involves adaption of the behavior of a component in one vehicle independently of the operation of other instances of the component in other vehicles.

Adaption can comprise back-propagation training of one or more components of the vehicle cabin monitoring system within the vehicle itself with a view to updating the weights used by the or each component—if sufficient processing power is available locally.

Alternatively, ground truth data for the vehicle can be uploaded from the vehicle to a retraining service which performs the back-propagation training of the one or more components of the vehicle cabin monitoring system, before returning updated weights to the vehicle—if sufficient bandwidth and a secure connection between the vehicle and the retraining service is available. So, for example, this might only be performed when a vehicle returned to within a home WiFi network.

The above can be applied to multiple types of driver monitoring or occupant monitoring technologies.

BRIEF DESCRIPTION OF THE DRAWINGS

An embodiment of the invention will now be described, by way of example, with reference to the accompanying drawings, in which.

DETAILED DESCRIPTION

Figure 2:
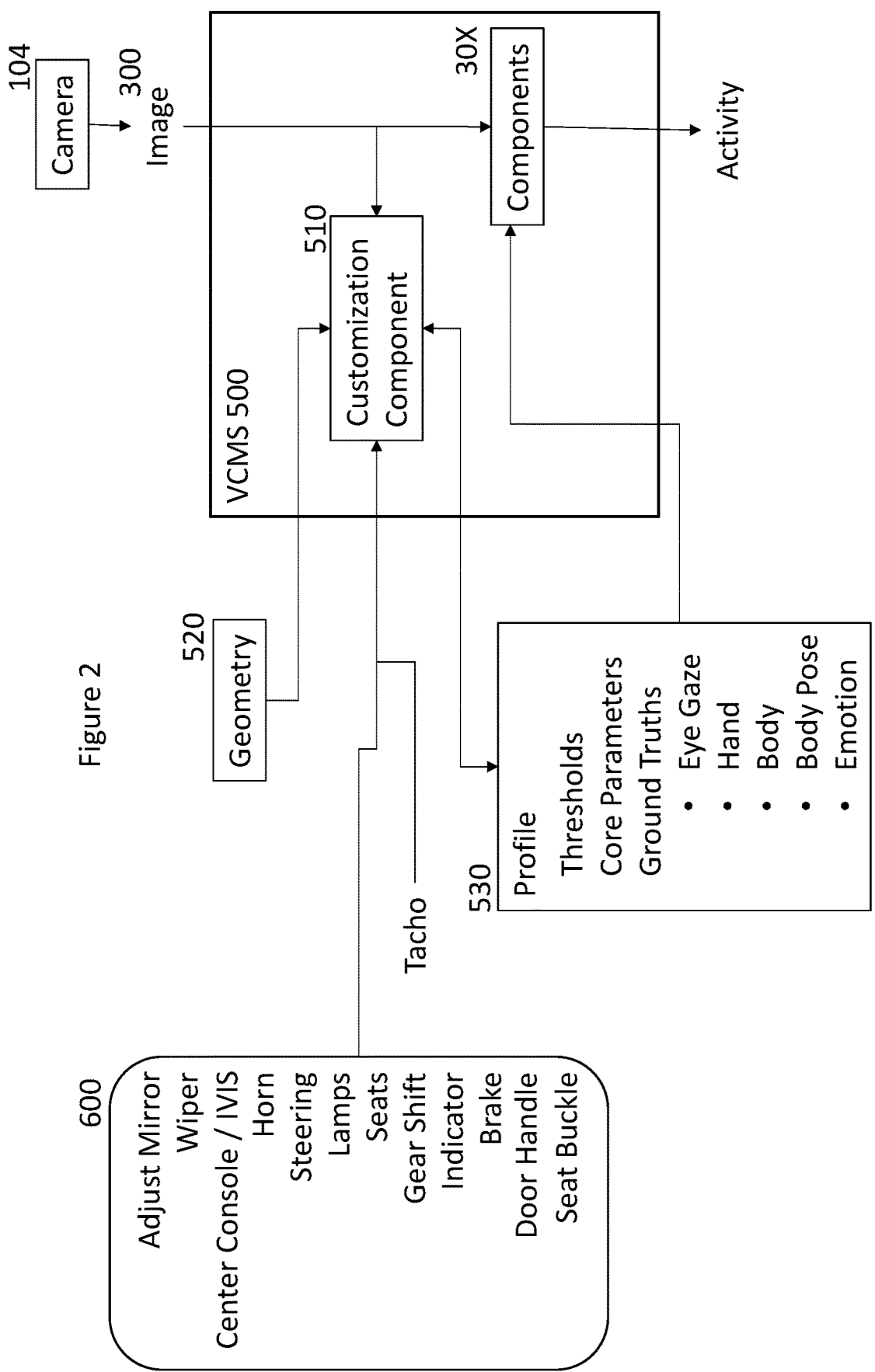
FIG. 2 illustrates a vehicle cabin monitoring system for according to an embodiment of the present invention.

Referring now to FIG. 2, embodiments of the present invention comprise a vehicle cabin monitoring system, VCMS, 500 which, as in the prior art, comprises a number of inferential components 30X which receive a stream of images 300 from an image acquisition device 104 with a view to determining an activity of one or more occupants of the vehicle. As well as user activity or behavior, other inferences can be made by components of the system such as attention zone detection, manual distraction detection, driver/occupant state, for example, emotion or drowsiness and driver/occupant characteristics, such as, body size or gender.

Figure 1:
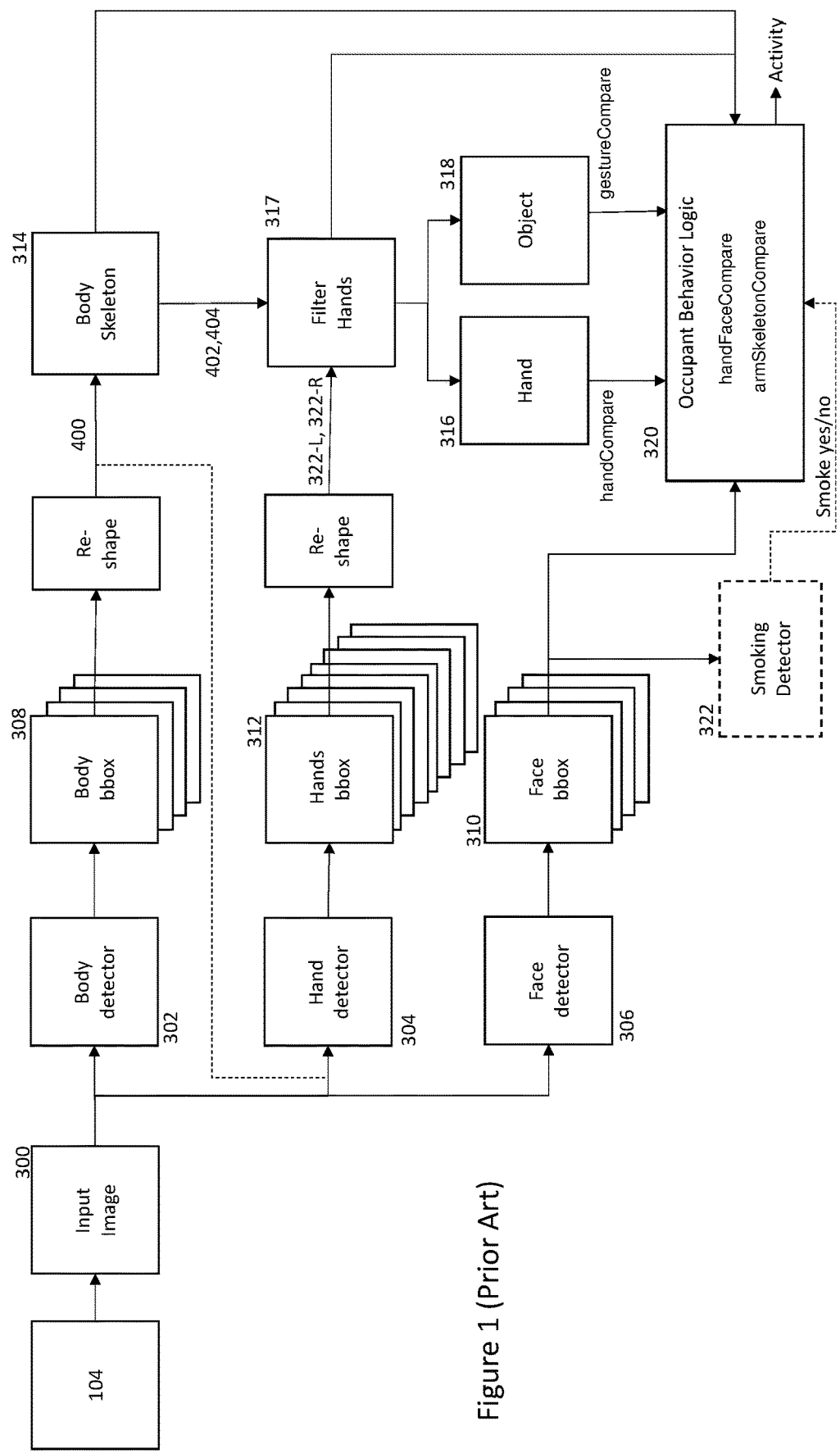
FIG. 1 illustrates the components of a conventional vehicle cabin monitoring system.

As such, the components 30X can comprise any of the networks 302, 304, 306, 314, 316-318, 320 and 322 described in relation to FIG. 1 as well as any other suitable component networks.

In embodiments, the VCMS 500 can be executed on a neural network processing core of the vehicle, for example, as described in WO2019/042703 (Ref: FN-618-PCT), the disclosure of which is incorporated herein by reference. The processing core obtains images from the image acquisition device 104 across a system bus (not shown) and can make the results of its processing—a determined activity—available across the bus to any other components of the vehicle.

At least one of the components 30X comprises core processing layers whose inferential ability is determined by core parameters. In the case of convolutional neural networks, these parameters for core processing layers can comprise weights. In particular, embodiments of the invention are concerned with customizing the weights of the final classification layers of one or more convolutional neural network components of the system 500. However, it will be appreciated that any core parameters including kernel weights or activation function parameters or other network parameters can be customized as required. The inferential components 30X are not limited to classifiers and other inferential components might for example, perform regression tasks.

As well as the normal operating components 30X of the system, such as described in relation to FIG. 1, embodiments of the present invention include a customization component 510. The customization component 510 also has access to the images 300 which are acquired by the system 500 as required i.e. the component 510 does not necessarily need to analyze every acquired image. Furthermore, the customization component 510 has access to details of the vehicle cabin geometry 520. This allows the customization component 510 to know where the various controls 600 with which a user might interact appear within the field of view of the image acquisition device 104. This geometry 520 can be hard coded into the customization component 510 or the geometry 520 can be commonly available to various vehicle control components including the VCMS 500 across the system bus.

As indicated, the customization component 510 is also able to monitor the status of one or more vehicle controls 600 across the system bus. A non-exhaustive exemplary list of interactive controls includes controls for adjusting mirrors, vehicle wipers, center console, horn, steering wheel, lamps, seats, gear shift, indicator, brake, door handle, seat buckle. It will also be appreciated that the system can communicate with other vehicle control nodes, such as a tachometer, to determine vehicle speed.

The VCMS 500 can do so, by adding itself as a listener to these controls, so that when they are actuated or change state, the customization component 510 is notified. Alternatively, the VCMS 500 can poll such information as may be required. The acquired information can in turn be used to signal to the customization component 510 that it should acquire a simultaneously acquired image 300 from the image acquisition device 104 which will contain ground truth information in one or more regions of the image.

In particular, the image may contain ground truth information which has not been detected by a component 30X of the VCMS 500 and which may indicate that adaption of the core processing layers of that component would be appropriate.

Thus, if for example, the customization component 510 detects that an indicator has been actuated, and if a hand detector, such as the detector 304 within the components 30X does not detect a hand, it may indicate that adaption of that component is required.

As will be well understood, the performance of the components 30X of the VCMS 500 is governed both by core processing parameters for the components 30X as well as thresholds which are applied to the outputs of the components with a view to determining for example, where a region of interest, ROI, within an image comprises a class of interest. By default, components 30X will operate based on a set of parameters common to all users of the vehicle.

In embodiments of the present invention, the customization component 510 is responsible for acquiring new ground truth data and using this to retrain one or more of the components 30X in order to determine core parameters for those component(s) 30X of the VCMS 500 specific either to the vehicle or to a particular user of the vehicle.

In the embodiment, customization is per user, and so each user of a vehicle, typically the driver, is provided with dedicated user profile 530 for the vehicle. As such, customizations for one user will not affect other users of the vehicle. The user profile 530 is stored in an embedded database that is accessible by VCMS 500 to provide improved quality results for the specific user. In some embodiments, this information is not transmitted outside of the VCMS 500—especially where the vehicle has the computational resources to perform the required retraining of the network components 30X. In some embodiments, the user profile 530 comprises a unique person ID number assigned by the VCMS 500 to distinguish the person's identity, without containing any sensitive personal information.

As discussed above, in some implementations, the user profile 530 can store a set of thresholds for use by one or more components 30X of the VCMS 500 to distinguish between false positives and true positives. These thresholds start with default generic pre-computed values, but as the user continues using the vehicle, they can be tuned to improve the performance of the vehicle.

So, for example, if a vehicle is being driven and a driver's hands are not detected by a hand detector, the thresholds for the hand detector 304 can be lowered. This is a quick solution to the problem, but it will not in itself get to the core of an issue with recognizing a driver's hands, because they may have an unusual appearance.

Embodiments of the present invention are based on automatically obtaining new ground truth samples for the vehicle. Each sample comprises an image and one or more annotations or labels for the image or region of interest within the image. So, for example, a new ground truth sample could comprise an image where a region of interest within the image is labelled as comprising a hand. Other labels can indicate a gaze angle, a body, a body pose or an emotion as will be explained in more detail below.

Such ground truths can be used to retrain one or more components 30X of the VCMS 500.

In embodiments, retraining is constrained to the last few layers of the component(s) 30X of concern. In a classifier, this will typically comprise the fewest number of fully connected nodes.

The customization component 510 is able to combine knowledge of the location of the control within the controls 600 which has been actuated and obtained from the vehicle geometry 520 in order to locate the object of interest within the image 300 acquired from the camera and to store this within the profile 530 for the user as new ground truth information for a specific occupant of the vehicle.

The signals received from the vehicle indicate to the system that a vehicle occupant is interacting with the vehicle in a particular manner. As such, the vehicle can assume, for example, that an occupant's hand is in a particular location, possibly with a particular pose or orientation, that their head is in a particular location and pose, their body is in a particular pose, their face displays a particular emotion and their gaze may be in a particular direction within the field of view of the image acquisition device as they interact with the controls.

Knowledge of the vehicle geometry then tells the system where the user's body parts are expected to appear within the field of view of the image acquisition device 104.

This region of interest of an image 300 acquired at or around the time of the user's activity can then be treated as a true image of the user's hand, body pose, gaze or emotion at a given time and can be annotated accordingly for re-training of the core processing layers of one or more of the components 30X of the VCMS 500 in order to tune system performance for a given user.

Below are examples of physical controls and these are used for establishing new ground truth samples:

adjusting rear-view mirror position, adjusting side mirror position

Gaze direction ground truth is extracted on the basis that the driver is looking at the mirror for which the position adjustment is done.

Hand detection ground truth is extracted on the basis that the person's hand is on the button used for mirror position adjustment.

Thus, once the location of the mirror adjustment controls relative to the location of the image acquisition device 104 is known from the vehicle geometry 520, the VCMS 500 can determine that a driver's hand will be located in a particular region of interest of images acquired while the driver is actuating the mirror controls. The image can be annotated accordingly and stored in the user profile 530 for use in subsequent retraining of a hand detector component.

It can also be assumed that eye regions detected within a face region within the field of view of the image acquisition device 104 at the time driver is actuating the mirror controls comprise pupils gazing in the direction of the mirror being controlled. As such, a gaze angle can be determined for those eye regions.

Again, such an image along with the eye gaze angles as annotations for the image can be stored in the user profile 530 for use in subsequent retraining of an eye gaze component.

Turning on Rear-Wiper

Gaze direction ground truth is extracted on the basis that the driver is looking at the rear-view mirror around the time of actuation of a rear-wiper control.

Hand detection ground truth is extracted on the basis that the person's hand is on the button used for turning on rear-wiper.

Operating Buttons on a Center Console/IVIS (in Vehicle Information System)

Hand detection ground truth is again extracted on the basis that an occupant's hand is on a button of a vehicle center console. Note that in this case, it cannot be assumed that the hand is the driver's hand and further conditions may need to be applied to determine whether a ground truth view of the driver's hand or a view of the front seat passenger's hand has been obtained.

Particular IVIS controls can also be used to infer specific significance:

Volume Up Music

As well as hand detection ground truth described above, emotion detection ground truth is extracted on the basis that a face region detected for either the driver or passenger who is actuating this particular control, has a positive emotion when turning up the music volume.

Honking/Wheel Steering

Hand detection ground truth is extracted on the basis that one or both of a driver's hand(s) are on the steering wheel when turning; or that one of the driver's hands is on the horn when it is actuated.

Turning on Backseat Map Lamps

Body pose ground truth is extracted on the basis that the person's body pose is "Turning Back" when turning on the backseat map lamp. Again, in a case such as this, further conditions may need to be applied to determine that there are no persons detected in the backseat who might be performing this operation.

Adjusting Seat Position

Body pose ground truth is extracted on the basis that the person's body pose is "Leaning Forward" when adjusting their seat front/back position.

Gear Shift

Hand detection ground truth is extracted on the basis that the driver's hand(s) is on the gear shift actuator.

Turn Vehicle Left/Right

Body pose ground truth is extracted on the basis that the person's body pose is "Turning Left/Right" when steering the vehicle.

Again, either body pose or hand detection ground truth can be established when the driver actuates the indicator to signal that they will be turning at some stage in the future.

Sudden Obstacle Avoidance

Emotion detection ground truth is extracted on the basis that a face detected for a driver (and possibly a passenger) has a tense and surprised emotion when avoiding a sudden obstacle. This can be inferred based on a steering wheel turning pattern. In cases, such as this, a decision needs to be made as to which of a number of images acquired during a steering maneuver is stored as the exemplary ground truth image e.g, it may be taken as the image acquired a typical human reaction time into a steering maneuver.

Sudden Push of Brake Pedal

Emotion detection ground truth is extracted on the basis that a face detected for a driver (and possibly a passenger) has a scared/surprised emotion when suddenly using the brake. This can be inferred based on the input signal pattern from the brake pedal. Again, a decision needs to be made as to which of a number of images acquired during the braking maneuver is stored as the exemplary ground truth image e.g, it may be taken as the image acquired a typical human reaction time after braking is initiated.

Vehicle Speed≠0

Body region ground truth is extracted on the basis that there must be a person in the driving seat when it is being driven.

Each of these ground truths may confirm an inference being made by a component 30X at a given time. However, if the corresponding component 30X, fails to identify a hand location, a gaze, body location, body pose or emotion when expected by the customization component, it may indicate that retraining of that component is required.

Nonetheless, it should also be appreciated any given ground truth sample may be employed in the retraining of more than one component of the network.

Retraining, especially retraining which requires back-propagation almost certainly will not be requested in response to a single discrepancy between a ground truth determined by the customization component 510 and a component 30X of the VCMS 500—this may only be triggered after a threshold number of ground truths has been accumulated.

It will also be appreciated that any ground truth which is acquired and which agrees with an inference made by a component 30X of the VCMS 500 need not necessarily be retained for use in retraining, as this may not improve the inferential performance of the component—merely confirm it.

In some embodiments, the user profile will initially be populated with a set of default thresholds and core parameter values with some of these being overwritten after re-training of a given one or more components 30X.

In other embodiments, the profile will only contain customized threshold values and core parameters, with default thresholds and core parameter values being stored centrally. This involves the VCMS 500 being able to draw certain parameters for configuring the components 30X from a default location and a customized location as required.

Note that adjusting the thresholds and retraining the core parameters of the network can cooperate. Thus, while the VCMS 50 is obtaining new ground truth data with a view to retraining various components of the network, it can at the same time be adjusting one or more of the thresholds employed by the components with a view to improving their performance. Thus, each time a hand detector fails to detect a hand when the customization component 510 indicates that a hand should have been detected within a region of interest within the field of view, the threshold for the hand detection might be reduced slightly, until there comes a point where sufficient new ground truth information is available for retraining the hand detector and a new set of core parameters are generated. The default threshold might then be re-applied to the hand detector so that it provides improved ability to detect the hand of the particular user of the vehicle.

One exemplary approach for retraining one or more components of a network is disclosed in U.S. application Ser. No. 17/189,035 entitled "Method and system for training a neural network" filed 1 Mar. 2021 (Ref: FN-665-US) the disclosure of which is incorporated herein by reference. This system employs a combination of positive and negative mining of samples in accordance with the available annotations for the samples.

As mentioned, back-propagation training of a network involves substantial computational resources. If sufficient resources are available within the vehicle, then retraining of the component(s) 30X can be performing using the locally available ground truth data from within the user profile 530 in order to update the core parameters for the component(s) 30X for storage in the profile. On the other hand, especially if sufficient resources are not available locally, the ground truth data from within the user profile can be offloaded to an external re-processing system/service (not shown) where it is used to generate an updated set of core parameters which are then downloaded to the user profile 530.

Note that once a set of ground truths has been used for retraining, they can be deleted from the user profile as the information they contain should now be encoded within the updated core parameters for the components 30X.

The invention claimed is:

1. A vehicle cabin monitoring system comprising:
a processor configured to obtain a sequence of images from an image acquisition device having a field of view including at least a portion of a vehicle cabin, said processor comprising one or more image processing components configured to obtain image information from an image and to make an inference based on said image information, the inferential ability of at least one of said one or more image processing components being governed by core processing parameters;
a vehicle geometry store, the store encoding a spatial relationship between said image acquisition device and at least one user interactive control for said vehicle, so that a location of the or each user interactive control within the field of view of the image acquisition device can be determined;
a customization profile for storing:
one or more annotated images, each annotated image being associated with at least one annotation indicating a ground truth for an associated region of said annotated image; and
a plurality of core processing parameters for at least one image processing component of said processor;
wherein the customization profile is configured to store at least one customized threshold for a user in relation to an image processing component for testing a classification provided by said image processing component and modify said customized threshold before re-training said image processing component and determining a new ground truth for said image processing component, wherein the re-training is initiated in response to a count of accumulated ground truths reaching the customized threshold, wherein the customized threshold is a predefined number of ground truths that need to be accumulated for each classification;
the system being:
responsive to user interaction with a user interactive control of said vehicle within said field of view of said image acquisition device for storing an image acquired by said image acquisition device at or around the time of said interaction in said customization profile with an annotation indicating
a ground truth for an associated region of said image according to said interaction; and
configured to use one or more annotated images from said customization profile for re-training an image processing component of said processor and for storing updated core processing parameters produced by said re-training in said customization profile for use by said re-trained image processing component in processing subsequently acquired images.

2. The system of claim 1 wherein the user interactive controls include: controls for adjusting mirrors, controls for vehicle wipers, a center console, a horn, a steering wheel, lamp controls, seat controls, a gear shift, an indicator, a brake, a door handle or a seat buckle.

3. The system of claim 1 wherein the annotations comprise any of: eye gaze angle, a hand indication, a body indication, a body pose indication or an emotion indication for a region of interest of an image.

4. The system of claim 1 configured to communicate with one or more non-interactive vehicle components in order to determine vehicle state.

5. The system of claim 1 wherein said one or more non-interactive vehicle components include a tachometer.

6. The system of claim 1 wherein said image processing component comprises a classifier with at least one fully connected classification layer and wherein re-training is limited to adjusting weights for a subset of said fully connected classification layers.

7. The system of claim 1 wherein said subset comprises a final set of fully connected classification layers.

8. The system of claim 1 wherein said system is configured to perform said re-training within said vehicle.

9. The system of claim 1 wherein said system is configured to provide said one or more annotated images for an image processing component to an external re-training system and to receive updated core processing parameters for said image processing component from said external re-training system.

10. The system of claim 1 comprising a customization profile for each driver of the vehicle, the system being responsive to being provided with an identity of the driver for storing one or more annotated images and a plurality of core processing parameters for at least one image processing component of said processor in the customization profile for the identified driver.

11. The system of claim 1 wherein the system is responsive said user interaction lwith a user interactive control of said vehicle within said field of view of said image acquisition device and a corresponding image processing component failing to detect said interaction for storing said image acquired by said image acquisition device at or around the time of said interaction in said customization profile with an annotation indicating a ground truth for an associated region of said image according to said interaction.

12. The system of claim 1 being responsive to receiving a plurality of core processing parameters for at least one image processing component of said processor for deleting one or more annotated images used for generating said core processing parameters from said customization profile.

13. The system of claim 1 wherein modifying said customized threshold comprises reducing a value of said customized threshold in response to determining a previous ground truth is incorrect.

* * * * *